US012810414B2

(12) United States Patent
Abe

(10) Patent No.: US 12,810,414 B2
(45) Date of Patent: Nov. 24, 2026

(54) MEDICAL IMAGE PROCESSING APPARATUS, X-RAY DIAGNOSIS APPARATUS, AND MEDICAL IMAGE PROCESSING METHOD

(71) Applicant: Canon Kabushiki Kaisha, Tokyo (JP)

(72) Inventor: Shingo Abe, Nasushiobara (JP)

(73) Assignee: Canon Kabushiki Kaisha, Tokyo (JP)

( * ) Notice: Subject to any disclaimer, the term of this patent is extended or adjusted under 35 U.S.C. 154(b) by 495 days.

(21) Appl. No.: 17/651,445

(22) Filed: Feb. 17, 2022

(65) Prior Publication Data

US 2022/0172361 A1 Jun. 2, 2022

Related U.S. Application Data

(63) Continuation of application No. PCT/JP2020/031427, filed on Aug. 20, 2020.

(30) Foreign Application Priority Data

Aug. 22, 2019 (JP) ................................ 2019-152360
Aug. 19, 2020 (JP) ................................ 2020-138714

(51) Int. Cl.
*G06T 7/00* (2017.01)
*G06T 7/20* (2017.01)

(52) U.S. Cl.
CPC .............. *G06T 7/0012* (2013.01); *G06T 7/20* (2013.01); *G06T 2207/10116* (2013.01)

(58) Field of Classification Search
CPC . G06T 2207/10016; G06T 2207/10116; G06T 2207/10121; G06T 2207/20221;
(Continued)

(56) References Cited

U.S. PATENT DOCUMENTS

2002/0085667 A1* 7/2002 Miller .................... H04N 25/30 378/42
2007/0165930 A1* 7/2007 Feuerlein .................. G06T 1/60 382/128
(Continued)

FOREIGN PATENT DOCUMENTS

JP 2000-59631 A 2/2000
JP 2002-333974 A 11/2002
(Continued)

OTHER PUBLICATIONS

International Search Report issued Nov. 10, 2020 in PCT/JP2020/031427 filed on Aug. 20, 2020, 2 pages.
(Continued)

*Primary Examiner* — Gregory A Morse
*Assistant Examiner* — Stefano Anthony Dardano
(74) *Attorney, Agent, or Firm* — Oblon, McClelland, Maier & Neustadt, L.L.P.

(57) ABSTRACT

According to one embodiment, a medical image processing apparatus includes processing circuitry. The processing circuitry is configured to acquire a plurality of time-series X-ray images of an object. The processing circuitry is further configured to extract a motion related component in each of the plurality of X-ray images. The processing circuitry is further configured to generate an emphasis processing image in which a moving target is emphasized in each of the plurality of X-ray images based on the extracted motion related component.

16 Claims, 9 Drawing Sheets

(58) Field of Classification Search
CPC . G06T 2207/20224; G06T 2207/30021; G06T 5/50; G06T 7/0012; G06T 7/20; A61B 6/12; A61B 6/461; A61B 6/481; A61B 6/486; A61B 6/487; A61B 6/501; A61B 6/505; A61B 6/5235; A61B 6/5264; A61B 6/54
See application file for complete search history.

(56) References Cited

U.S. PATENT DOCUMENTS

| | | | | |
|---|---|---|---|---|
| 2008/0303951 | A1* | 12/2008 | Nakayama | G06T 5/50 348/607 |
| 2010/0128955 | A1 | 5/2010 | Walimbe et al. | |
| 2012/0163534 | A1* | 6/2012 | Nambu | A61B 6/486 378/44 |
| 2012/0250974 | A1* | 10/2012 | Miyamoto | G06T 7/11 382/132 |
| 2013/0136332 | A1* | 5/2013 | Uehara | A61B 6/5235 382/132 |
| 2015/0139394 | A1 | 5/2015 | Kang et al. | |
| 2015/0366529 | A1* | 12/2015 | Shimizu | A61B 6/12 378/62 |
| 2016/0120491 | A1* | 5/2016 | Shimamura | G06V 10/758 348/333.05 |
| 2016/0350910 | A1* | 12/2016 | Jeong | A61B 6/482 |
| 2016/0350913 | A1* | 12/2016 | Nagae | G06T 7/174 |
| 2018/0082420 | A1 | 3/2018 | Brown et al. | |
| 2018/0125434 | A1* | 5/2018 | Yang | A61B 6/03 |
| 2018/0146944 | A1 | 5/2018 | Matsutani | |
| 2018/0368797 | A1* | 12/2018 | Kuwata | A61B 6/5217 |
| 2020/0305828 | A1* | 10/2020 | Yoshida | A61B 6/12 |
| 2020/0410666 | A1* | 12/2020 | Wagner | A61B 6/486 |

FOREIGN PATENT DOCUMENTS

| | | | |
|---|---|---|---|
| JP | 2006-255217 | A | 9/2006 |
| JP | 2009-039521 | A | 2/2009 |
| JP | 2010-119852 | A | 6/2010 |
| JP | 2013-111227 | A | 6/2013 |
| JP | 2018-083010 | A | 5/2018 |
| WO | WO 2014/192504 | A1 | 12/2014 |

OTHER PUBLICATIONS

Extended European Search Report issued Jan. 5, 2023 in European Patent Application No. 20853749.8, 10 pages.
Japanese Office Action issued Jul. 9, 2024 in Japanese Patent Application No. 2020-138714, 5 pages.
Office Action issued Dec. 10, 2024, in corresponding Japanese Patent Application No. 2020-138714, 5 pages.
Office Action issued Aug. 4, 2026, in corresponding Japanese Patent Application No. 2025-182512 with English Translation; 10 pages.

* cited by examiner

IMAGE BEFORE PROCESSING $I_n$

EMPHASIS PROCESSING IMAGE $ESI_n$

MEDICAL IMAGE PROCESSING APPARATUS, X-RAY DIAGNOSIS APPARATUS, AND MEDICAL IMAGE PROCESSING METHOD

CROSS-REFERENCE TO RELATED APPLICATIONS

This application claims the benefit of priority of Japanese Patent Application No. 2019-152360, filed Aug. 22, 2019, and Japanese Patent Application No. 2020-138714, filed Aug. 19, 2020, the entire contents of which are incorporated herein by reference.

FIELD

Embodiments described herein relate generally to a medical image processing apparatus, an x-ray diagnostic apparatus, and a medical image processing method.

BACKGROUND

X-ray diagnostic apparatuses such as an X-ray fluoroscopic apparatus and an X-ray angiography apparatus have been provided recently in which the inside of an object can be observed in real time by irradiating the object with X-rays and sequentially displaying the acquired images like moving images in real time. Further, the time-series X-ray images acquired by the X-ray diagnostic apparatus can be observed as moving images a plurality of time-series X-ray images acquired by the X-ray diagnostic apparatus can be observed as a moving image in the X-ray diagnostic apparatus or other modality after the scan in the post process.

Such X-ray diagnostic apparatus may be used for angiography using a catheter of IVR (Interventional Radiology). For example, when performing a catheter treatment, a user may display an X-ray fluoroscopic image based on X-ray imaging by an X-ray diagnostic apparatus in real time, and the procedure may be performed while checking positions of a catheter and a treatment device such as a balloon (including the indwelling position) depicted in the X-ray image. Further, after the procedure, the X-ray image may be used to confirm whether the treatment device such as the balloon has been placed at a desired position.

Generally, image processing such as background compression, signal enhancement, and gradation conversion is performed on the X-ray image in order to improve the visibility of instruments such as contrast agents and catheters depicted on X-ray images. By performing image processing such as gradation conversion, it is possible to emphasize in the X-ray image the shade of a device such as a contrast agent or a catheter, which is the target to be observed for the user.

However, when there are non-target components such as bones and diaphragms depicted in the same X-ray image, the shades of these non-target components are also emphasized by the image processing such as gradation conversion. In this case, as a result of performing image processing such as gradation conversion, the visibility of the target may be worsened by the non-target components.

DETAILED DESCRIPTION

Hereinbelow, a description will be given of a medical image processing apparatus, an x-ray diagnostic apparatus, and a medical image processing method according to embodiments of the present invention with reference to the drawings.

According to one embodiment, a medical image processing apparatus includes processing circuitry. The processing circuitry is configured to acquire a plurality of time-series X-ray images of an object. The processing circuitry is further configured to extract a motion related component in each of the plurality of X-ray images. The processing circuitry is further configured to generate an emphasis processing image in which a moving target is emphasized in each of the plurality of X-ray images based on the extracted motion related component.

First Embodiment

Figure 1:
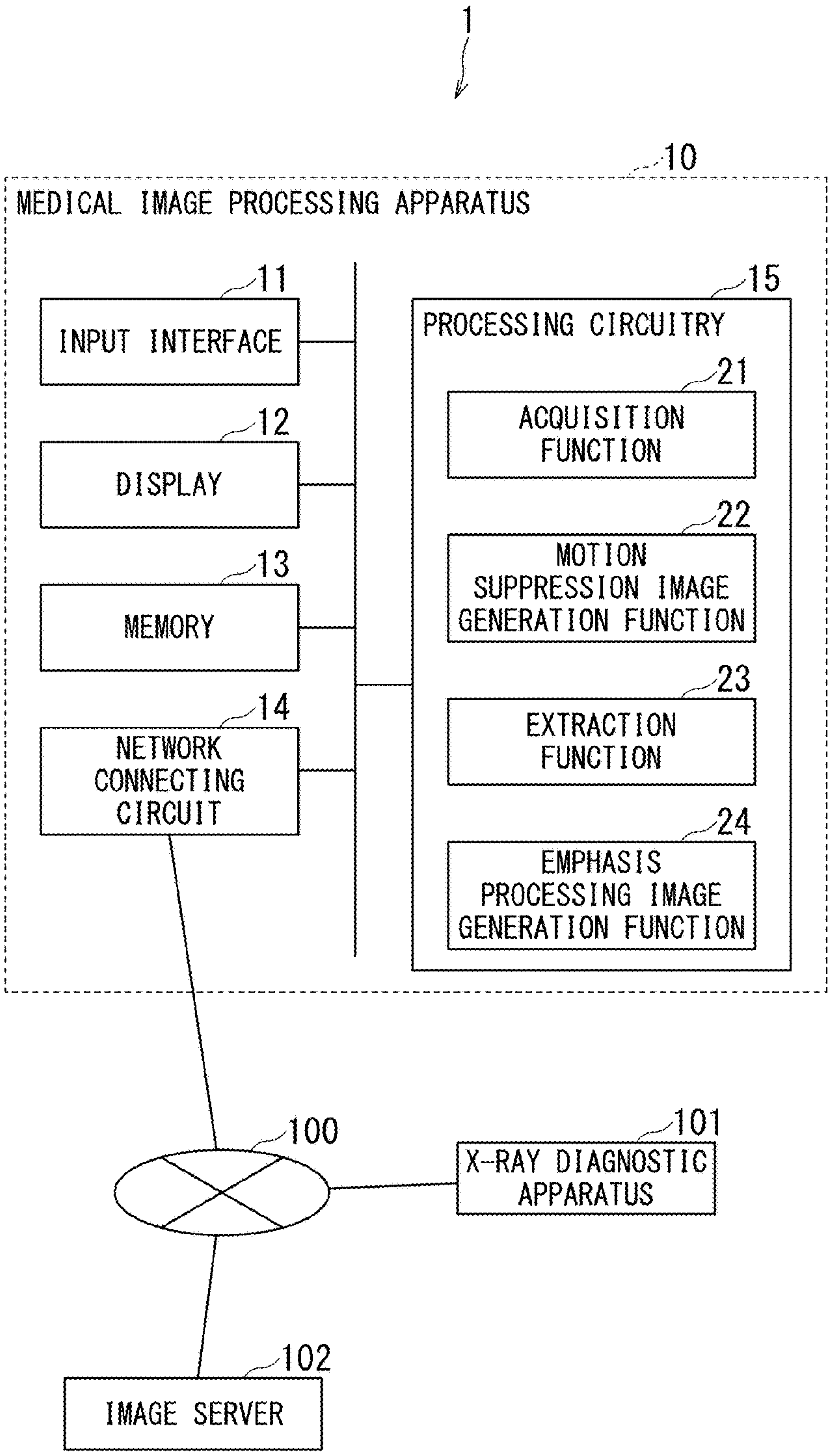
FIG. 1 is a block diagram showing an example of a medical image processing system 1 including a medical image processing apparatus according to the first embodiment.

FIG. 1 is a block diagram showing an example of a medical image processing system 1 including a medical image processing apparatus 10 according to the first embodiment.

The medical image processing system 1 includes a medical image processing apparatus 10 and an X-ray diagnostic apparatus 101. The medical image processing apparatus 10 has an input interface 11, a display 12, a memory 13, a network connecting circuit 14, and processing circuitry 15. The medical image processing apparatus 10 is an example of a server.

The input interface 11 is composited of a general input device such as a trackball, a switch button, a mouse, a keyboard, and a numeric keypad, and outputs an operation input signal corresponding to a user's operation to the processing circuitry 15. The display 12 is configured by a general display device such as a liquid crystal display or an OLED (Organic Light Emitting Diode) display.

The memory 13 has a configuration including a recording medium readable by a processor, such as a RAM (Random Access Memory), a semiconductor memory device such as a flash memory, a hard disk, an optical disc, and the like, is used by the processing circuitry 15, and stores parameter data and other data. Part or all of the programs and data in the recording medium of the memory 13 may be downloaded by communication via the network 100, or may be provided to the memory 13 via a portable storage medium such as an optical disc.

The network connecting circuit 14 implements various information communication protocols according to the network 100. The network connecting circuit 14 connects the medical image processing apparatus 10 to other electric devices via the network 100 according to the various protocols. The network 100 refers to all information communication networks using telecommunications technology and includes wireless/wired LANs such as hospital LANs (Local Area Networks) and Internet networks, as well as telephone communication line networks, optical fiber communication networks, cable communications networks and satellite communication networks.

The medical image processing apparatus 10 is connected to the X-ray diagnostic apparatus 101 and the image server 102 via the network 100 so that data can be transmitted and received between them. The X-ray diagnostic apparatus 101 includes an X-ray angiography apparatus, mammography apparatus, an X-ray TV apparatus, and the like. The X-ray diagnostic apparatus 101 is an example of a client.

The processing circuitry 15 realizes functions of centrally controlling the medical image processing apparatus 10. In addition, the processing circuitry 15 is a processor that reads and executes the program stored in the memory 13 to execute processing for appropriately performing emphasis processing of the target to be observed depicted in the X-ray image.

Figure 2:
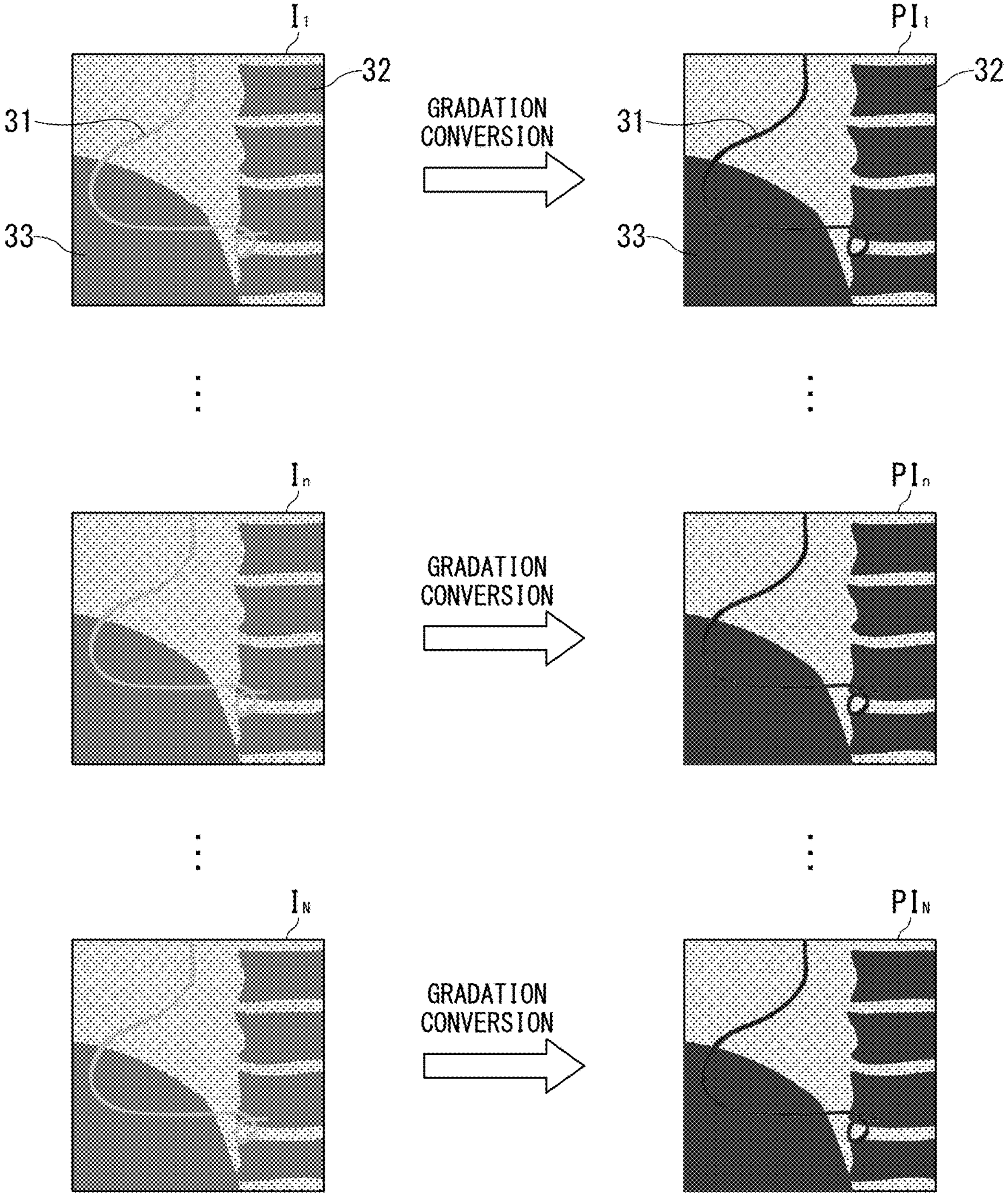
FIG. 2 is a diagram for explaining conventional image processing for emphasizing a target to be observed such as contrast agents and catheters.

FIG. 2 is a diagram for explaining conventional image processing for emphasizing the target to be observed such as contrast agents and catheters.

Considering a case where the X-ray diagnostic apparatus 101 captures time-series N-frame X-ray images In (n=1, 2, . . . , N) of the object into which the catheter 31 is inserted. Conventionally, each X-ray image In is subjected to image processing such as background compression, signal enhancement, and gradation conversion to generate a processed image PIn, whereby the shade (shadow, contrast) of the catheter 31 which is the user's target to be observed is emphasized (enhanced) in the X-ray image. However, when non-target components other than the catheter 31 such as the bone 32 and the diaphragm 33 are depicted in the X-ray image In, shades of these non-target components are also emphasized by image processing such as gradation conversion. In this case, in the processed image PIn, non-target components such as the bone 32 and the diaphragm 33 impede the catheter 31 to make it difficult to observe the catheter 31.

Therefore, the processor of the processing circuitry 15 extracts the target from the X-ray image In and composites the intermediate emphasis image that emphasizes the extracted target with the X-ray image In to generate an image (hereinafter referred to as emphasis processing image) in which the target depicted in the X-ray image In is emphasized.

As shown in FIG. 1, the processor of the processing circuitry 15 implements the acquisition function 21, the motion suppression image generation function 22, the extraction function 23, and the emphasis processing image generation function 24. Each of these functions is stored in the memory 13 in the form of a program.

In the following description, the X-ray image subject to the emphasis processing of the target according to the present embodiment may be an X-ray fluoroscopic image, or an X-ray image imaged at a higher dose than the X-ray fluoroscopic image.

Further, in the present embodiment, an example in which each function 21-24 is implemented by the processing circuitry 15 of the medical image processing apparatus 10 will be described. However, Some or all of these functions 21-24 of the medical image processing apparatus 10 may be realized by an external device that is independent from the medical image processing apparatus 10 and has at least a processor and memory such as a hospital server, cloud console, workstation, X-ray diagnostic apparatus 101, connected to the network 100. Further, the medical image processing apparatus 10 may be configured by a plurality of information processing devices connected to each other via the network 100, and each function 21-24 may be appropriately distributed and implemented by the plurality of information processing devices.

Next, the functions 21-24 will be described with reference to FIG. 3.

(Post Process)

First, a case will be described in which all of a plurality of time-series X-ray images I1, I2, . . . , IN are acquired in the post process, and an emphasis processing image of the X-ray image In of these X-ray images is generated.

Figure 3:
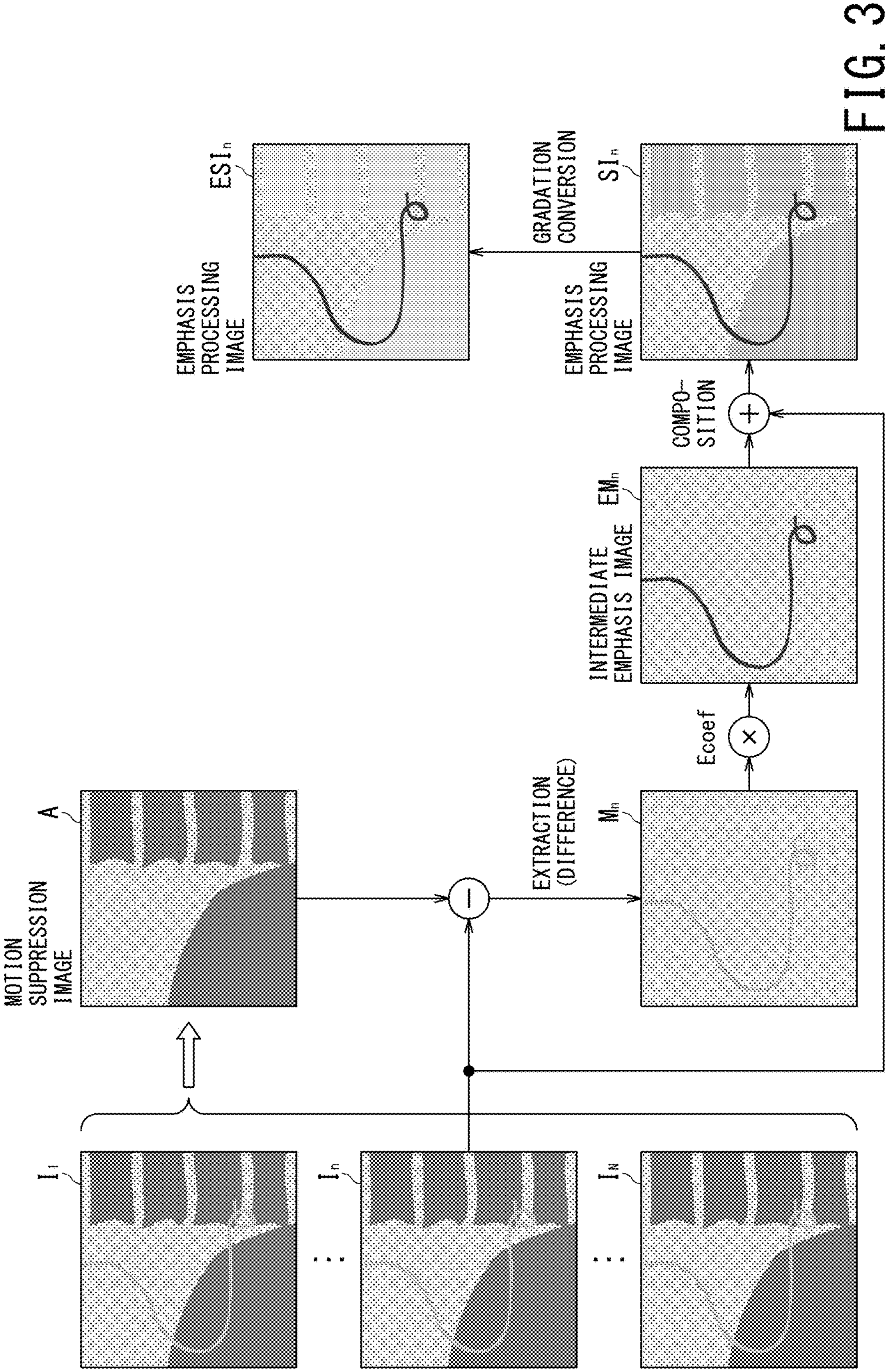
FIG. 3 is a diagram for explaining an example of a generation method of the emphasis processing image according to the first embodiment in the post process.

FIG. 3 is a diagram for explaining an example of a generation method of the emphasis processing image according to the first embodiment in the post process.

In the post process, the acquisition function 21 acquires the plurality of time-series X-ray images I1, I2, . . . , IN related to the object, which are obtained based on the X-ray imaging of the object performed by the X-ray diagnostic apparatus 101 (see the leftmost column in FIG. 3). The acquisition function 21 is an example of an acquisition unit. These X-ray images are acquired directly from the X-ray diagnostic apparatus 101 on which the X-ray imaging was performed, or indirectly via the image server 102.

In the post-process, the motion suppression image generation function 22 generates a motion suppression image in which motion related components are suppressed more than components that are stationary in at two or more of the plurality of time-series X-ray images, based on two or more of the plurality of time-series X-ray images I1, I2, . . . , IN. The motion suppression image generation function 22 is an example of a motion suppression image generation unit and a representative value image generation unit.

In the post-process, the motion suppression image A is generated based on two or more of the plurality of time-series X-ray images I1, I2, . . . , IN, and is an image (representative value image) each pixel of which has a representative value of pixel values of the two or more X-ray images.

For example, when the X-ray images I1, I2, . . . , IN are images of the heart of the object and the user's target to observe is the catheter 31, the catheter 31 moves greatly in the image by at least one of the pulsation and the respiratory movement of the object. In addition, when there is a body movement of the object, the entire image is displaced between frames. In this regard, by setting each pixel of the motion suppression image A as a representative value, the moving target is suppressed during imaging of the plurality of time-series X-ray images I1, I2, . . . , IN. A mean value or a median value can be used as the representative value, for example.

FIG. 3 shows an example in which the motion suppression image generation function 22 generates the mean value image A of all the X-ray images I1, I2, . . . , IN as the motion suppression image A (see two columns from the left in FIG. 3). In this case, the relationship between the pixel value A(i,j) of each pixel of the motion suppression image A (where i represents the x coordinate and j represents the y coordinate of each pixel) and the pixel value In(i,j) of each X-ray image In can be written as the following equation (1).

$$A(i,j) = \frac{1}{N}\sum_{n=1}^{N} I_n(i,j) \tag{1}$$

Further, the motion suppression image A may be a moving average image in which the frame range and the total number of frames are fixed, where the range may be set from the frame to be processed to 20 frames before or may be set 10 frames before and after the frame to be processed. In this case, it is possible to reduce the influence of a specific frame in which a large change of state has occurred during imaging on the motion suppression image A. In this case, the frame range and the total number of frames used for generating the motion suppression image A may use the setting values stored in the memory 13 in advance, or can be set by the user via the input interface 11 and can be changed by the user. Also the frame range and the total number of frames used for generating the motion suppression image A may be set so as to correspond to the period of one heartbeat of the object, or the period of the number of heartbeats input by the user via the input interface 11, or the period of a predetermined number of heartbeats stored in the memory 13. In the real-time processing described later, it is preferable that the user can change the setting at any time regardless of whether the X-ray irradiation is on or off.

In the post process, the extraction function 23 extracts the user's observation target from the X-ray image In. The extraction function 23 is an example of an extraction unit and a subtraction image generation unit. FIG. 3 shows an example in which the target is the catheter 31 that is inserted into the heart and moves along with the pulsation. In this case, the extraction function 23 will generate the target image Mn by generating the difference image between the X-ray image In and the motion suppression image A (see the lower second column from the left in FIG. 3). In this case, the pixel value Mn(i,j) of each pixel of the target image Mn can be expressed by the following equation (2).

$$M_n(i,j)=I_n(i,j)-A(i,j) \tag{2}$$

Note that the equation (2) shows an example in which a simple difference between the X-ray image In and the motion suppression image A is taken, but the difference may be taken after log-converting the X-ray image In and the motion suppression image A, or other subtraction methods may be used.

When the target itself moves within the object, such as a catheter 31 inserted into the heart or a contrast agent injected into the object, the extraction function 23 extracts information on the movement amount, the movement direction, and the like between the frames as the motion related component by extracting and comparing the linear shadows of the past frame (for example, the immediately preceding frame) and the processing target frame. In this case, it is not necessary to use the motion suppression image A for extracting the motion related component and generating the target image Mn, and thus the motion suppression image generation function 22 is not necessary.

In the post process, the emphasis processing image generation function 24 generates an emphasis processing image in which the target is emphasized in the X-ray image In based on the target image Mn, and displays it on the display 12.

Specifically, the emphasis processing image generation function 24 firstly determines, as shown in the following equation (3), multiplies each pixel of the target image Mn by a predetermined emphasis coefficient Ecoef. of a value of 0 or more (preferably 1 or more) to generate an intermediate emphasis image EMn. When the emphasis coefficient Ecoef. is larger than 1, the target is emphasized in the intermediate emphasized image EMn. When the emphasis coefficient Ecoef. is less than 1, the target is not emphasized in the intermediate emphasized image EMn, but the target can be emphasized in the emphasis processing image SIn discussed later.

$$EM_n(i,j)=M_n(i,j)\times \mathrm{Ecoef.} \tag{3}$$

In the example shown in FIG. 3, the catheter 31 extracted from the X-ray image In is emphasized (see the third column from the left in FIG. 3).

Note that the emphasis coefficient Ecoef. May be set values stored in the memory 13 in advance, or may be set by the user via the input interface 11 and changeable. In the real-time processing described later, it is preferable that the user can change the setting at any time regardless of whether the X-ray irradiation is on or off.

Further, the emphasis coefficient Ecoef. may be automatically set according to the parameters such as an SN ratio (signal-to-noise ratio) of a target X-ray image In, a CN ratio of a target (contrast-to-noise ratio), an X-ray condition including a tube voltage, a tube current, and a pulse width, a dose setting, the image processing setting, and the like. Even when the setting is automatically made in this way, the setting may be further changeable by the user.

Further, the generation process of the intermediate emphasis image EMn is not essential, and the target image Mn may be used instead of the intermediate emphasized image EMn to perform the generation process of the emphasis processing image SIn discussed later. Using the target image Mn instead of the intermediate emphasized image EMn has the same result as performing the emphasis process with the emphasis coefficient Ecoef. being 1.

The emphasis processing image generation function 24 then generates the emphasis processing image SIn by compositing the intermediate emphasis image EMn or the target image Mn and the original X-ray image In corresponding to the intermediate emphasis image EMn or the target image Mn. The composition may be simple addition or averaging, or weighted addition or weighted averaging. FIG. 3 shows an example of the case where the emphasis processing image SIn is generated by adding the intermediate emphasis image EMn and the X-ray image In (see the lower rightmost column in FIG. 3). In this case, the pixel value SIn(i,j) of each pixel of the emphasis processing image SIn can be expressed by the following equation (4).

$$SI_n(i,j)=I_n(i,j)+EM_n(i,j) \tag{4}$$

The emphasis processing image SIn is an image generated by compositing the X-ray image In with the intermediate emphasis image EMn in which the target is emphasized. Therefore, the emphasis processing image SIn is an image in which the target is emphasized and the non-target components are suppressed as compared with the X-ray image In before emphasis processing or an image obtained by performing conventional image processing on the X-ray image In.

In generating the intermediate emphasis image EMn, the pixel value of the target is multiplied by the emphasis coefficient Ecoef. Therefore, when the contrast and noise of the target are set to be approximately the same as those of the original image, in the window processing (gradation processing) of the emphasis processing image Sin, the relationship between the window width WWpost and the window width WWpre of the original image satisfies the condition of the following equation (5).

$$WW_{post}=WW_{pre}\times(\text{Ecoef.}+1) \tag{5}$$

Even when the contrast and noise are similar to those of the original image, the image level difference for the non-target component is relatively small with respect to the target in the emphasis processing image SIn. Therefore, the emphasis processing image SIn is an image in which the target can be easily identified.

Further, the emphasis processing image generation function 24 may generate an image ESIn in which the contrast of target is further improved as compared with the emphasis processing image SIn by narrowing WWpost shown in equation (5) (see the uppermost column in the rightmost column of FIG. 3).

$$WW_{post}=WW_{pre}\times(Ecoef.+1)\times\frac{1}{Cont_{up}} \tag{6}$$

In equation (6), $Cont_{up}$ has a value of 1 or more. By narrowing the window width from WWpost shown in equation (5), only the contrast of the target can be improved without causing a large change in the visibility of the non-target components.

Figure 4:
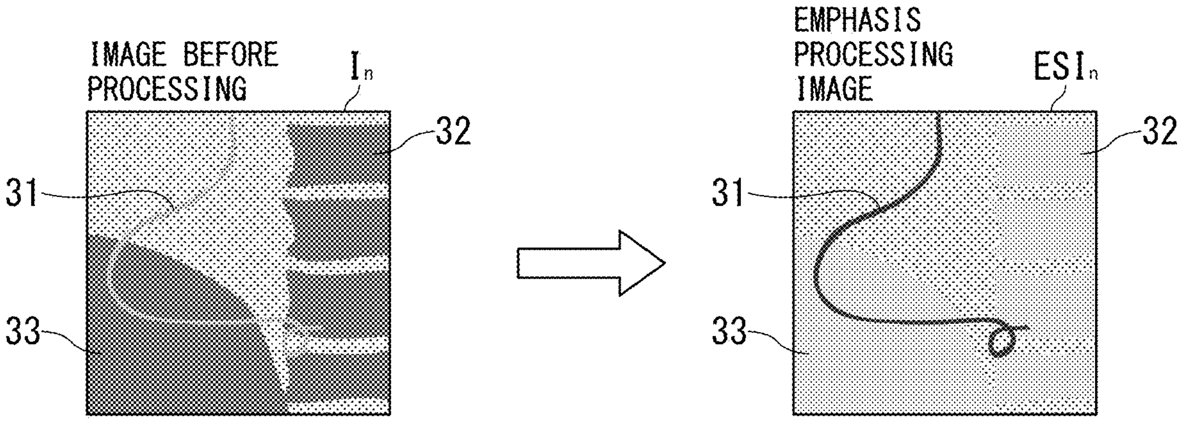
FIG. 4 is an explanatory diagram showing an example of an X-ray image In before processing and an emphasis processing image ESIn.

FIG. 4 is an explanatory diagram showing an example of the X-ray image In before processing and the emphasis processing image ESIn. As shown in FIG. 4, in the emphasis processing image ESIn, the catheter 31 of the X-ray image In is emphasized, while the bone 32 and diaphragm 33 which are the non-target components are suppressed.

As WWpost is narrowed, the contrast of the target is improved while the noise is also increased. Thus, the value of $Cont_{up}$ may be the setting value stored in the memory 13 in advance, or may be set by the user via the input interface 11 and changed by the user in consideration of contrast and noise.

Since the image level of the non-target components does not change significantly, the window center (window level) WC does not have to be changed when the non-target components occupy most of the image. Further, When an offset is added to the entire pixel value in a system in which a negative value cannot be used as the pixel value, the offset may be added to the window center.

(Real-Time Processing)

Next, real-time processing will be explained. Hereinafter, a case where the X-ray image In is newly acquired following a plurality of time-series X-ray images I1, I2, . . . , In−1, and the emphasis processing image of the newly acquired X-ray image In is generated.

In the real-time processing, the acquisition function 21 acquires the plurality of time-series X-ray images I1, I2, . . . , In of the object, which are obtained based on the X-ray imaging of the object by the X-ray diagnostic apparatus 101, from the X-ray diagnostic apparatus 101.

In the real-time processing, the motion suppression image generation function 22 generates the motion suppression image An in which the motion related component is suppressed based on two or more of the plurality of time-series X-ray images I2, . . . , In. When the motion suppression image generation function 22 generates the mean value images An of all the X-ray images I1, I2, . . . , In acquired up to the present time in real-time processing as motion suppression image An, the relationship between the pixel value An(i,j) of each pixel of the motion suppression image An and the pixel value In(i,j) of each X-ray image In can be written as the following equation (7).

$$A_n(i,j)=\frac{n-1}{n}A_{n-1}(i,j)+\frac{1}{n}I_n(i,j) \tag{7}$$

In this case, the motion suppression image An is recalculated and updated each time an X-ray image of a new frame is acquired.

Further, in this case, the extraction function 23 generates the target image Mn by generating a difference image between the X-ray image In and the motion suppression image An according to the following equation (8), for example.

$$M_n(i,j)=I_n(i,j)-A_n(i,j) \tag{8}$$

The method for the emphasis processing image generation function 24 to generate the intermediate emphasis image EMn and the emphasis processing image SIn or ESIn does not differ between the post-process and the real-time processing, and thus the description thereof will be omitted.

The emphasis processing image SIn or ESIn generated by real-time processing have the same effect as those of post-process generated emotion processing image SIn or ESIn.

However, in the real-time processing, immediately after the start of the processing, the number of frames of the X-ray images used to generate the motion suppression image An is small, and hence, there is a case where the representative value image may not be the motion suppression image (image in which motion is suppressed), such as the case where afterimages of a plurality of catheters 31 are appeared in the representative value image.

Hence, in real-time processing, the emphasis processing image SIn or ESIn and the original image In may be displayed simultaneously. Further, after the processing is started, only the original image In is displayed up to a predetermined number of frames, while after the predetermined number of frames, the emphasis processing image SIn or ESIn and the original image In are simultaneously displayed or the original image In may be switched to the emphasis processing image SIn or ESIn. Further, even in real-time processing, only the emphasis processing image SIn or ESIn may be displayed immediately after the start of processing. These display methods may be selectable by the user.

Immediately after the start of real-time processing, as described above, motion related components may remain in the representative value image. Therefore, in the generation of the intermediate emphasis image EMn, the emphasis coefficient Ecoef. may be changed to be gradually increased.

When there is no change in the irradiation field, motion suppression image A may be taken over and processing may continue regardless of whether X-ray irradiation is on or off. For example, X-ray irradiation is repeatedly turned on and off in the X-ray fluoroscopic imaging. In real-time processing, by taking over the motion suppression image An and continuing processing regardless of whether the X-ray irradiation is turned on or off, it is possible to avoid the inconvenience caused by the insufficient number of frames immediately after the X-ray irradiation is turned on again. Further, the motion suppression image A created in the post process may be used in the subsequent real time processing.

Figure 5:
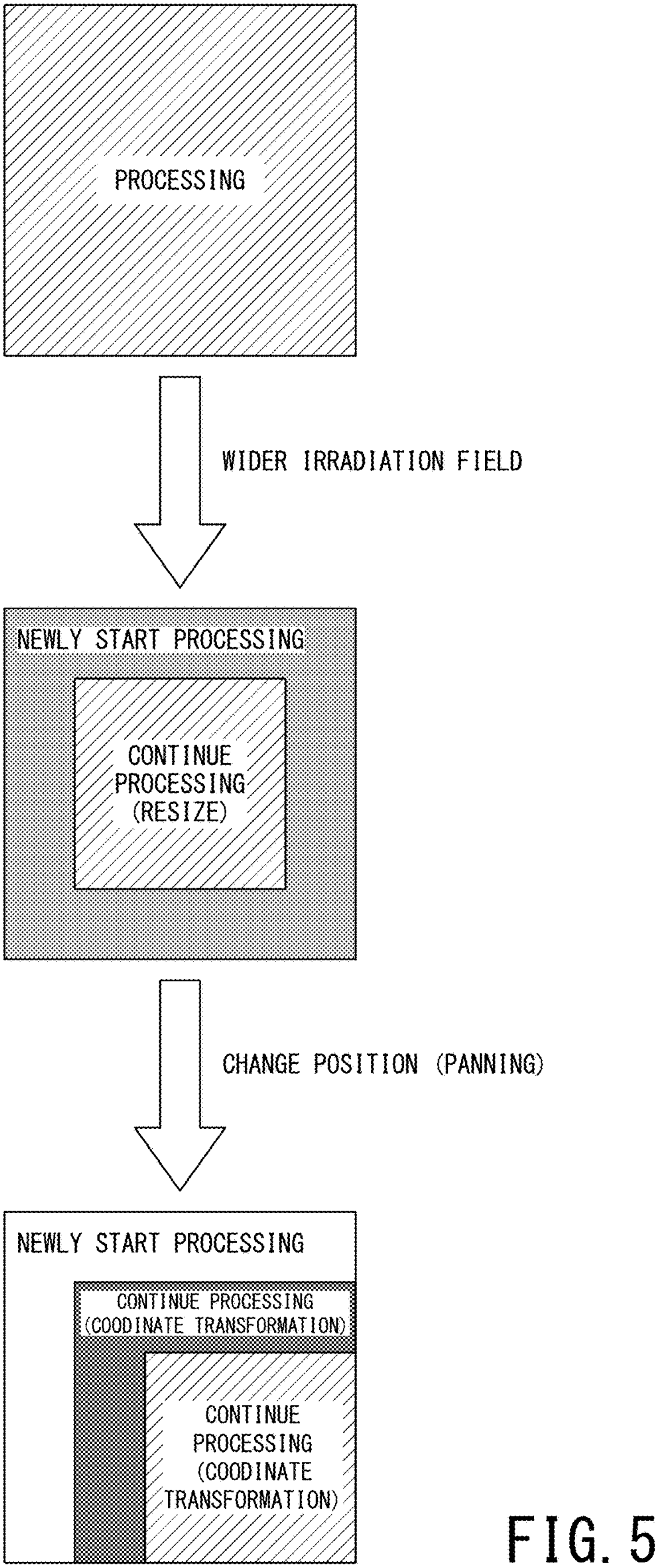
FIG. 5 is a diagram for explaining the emphasis process of the target to be observed when the X-ray irradiation field is widened and then the position of the irradiation field is changed.

FIG. 5 is a diagram for explaining the emphasis process of the target to be observed when the X-ray irradiation field is widened and then the position of the irradiation field is changed.

Even when the irradiation field is changed, the motion suppression image A generated before the change of the irradiation field can be used by obtaining the information on the irradiation field before and after the change from the X-ray diagnostic apparatus 101. When the irradiation field in the X-ray imaging of object is changed, the motion suppression image of the changed irradiation field can be generated such that the motion suppression image of the irradiation field before change, which is scaled (resized) or coordinate converted, is used as the part of the motion suppression image corresponding to the part of the irradiation field after the change that overlaps the irradiation field before the change.

Further, the emphasis processing of the target to be observed according to the present embodiment can also be applied to the X-ray image of the part that is not affected by the pulsation or the respiratory motion.

Figure 6:
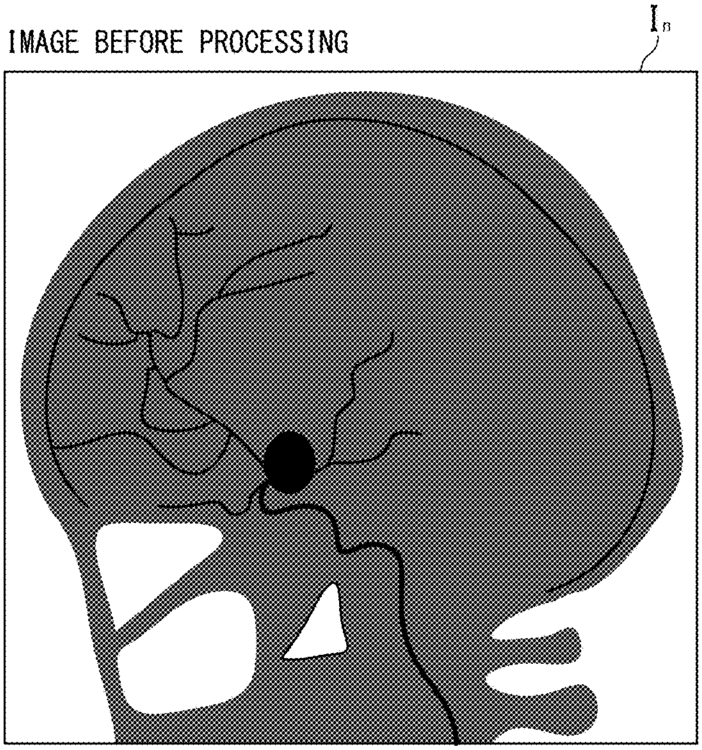
FIG. 6 is an explanatory diagram showing an example of the emphasis processing of the contrast agent depicted in the X-ray image of the head.
Figure 6:
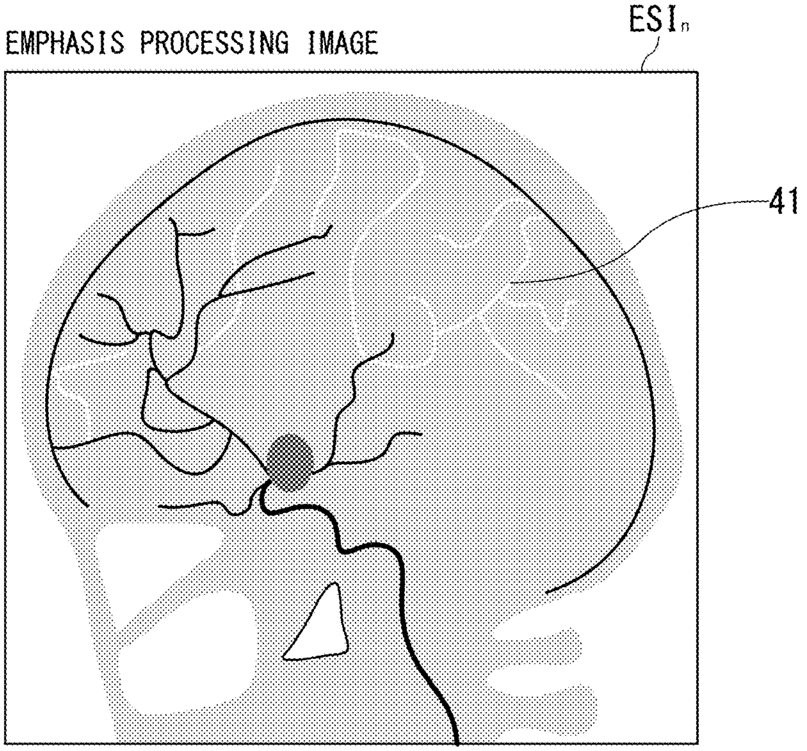

FIG. 6 is an explanatory diagram showing an example of the emphasis processing of the contrast agent depicted in the X-ray image of the head. FIG. 6 shows an example in which the target to be observed by the user is a contrast agent.

For example, considering a case where the motion suppression image generation function 22 generates the mean value image A of all X-ray images I1, I2, . . . , IN as motion suppression image A in the post process according to equation (1). Also in this case, since the motion suppression image A is the representative value image, the motion suppression image A is an image in which the influence of body movement is suppressed. Therefore, even if the target image Mn is generated by the extraction function 23 by the difference processing of equation (2), for example, an artifact due to misregistration does not occur.

Further, in this case, the motion suppression image A is generated by using the X-ray image In+1 and its subsequent X-ray images in which the contrast agent has already reached the blood vessel while the contrast agent has not reached the target X-ray image In. Meanwhile, the head does not move significantly except for body movement. Thus, the influence of body movement is suppressed, while the contrast agent is not suppressed even in the motion suppression image A. Therefore, the route of contrast agent (route of blood vessel) is drawn in a wide range in the motion suppression image A. Hence, as shown in FIG. 6, even in the emphasis processing image ESIn in which the flow of the contrast medium is emphasized as a motion, the route 41 of the blood vessel which is not dyed in the X-ray image In (but is dyed in its subsequent frames) can be depicted in a wide range. Therefore, the user can visually recognize the route of the blood vessel by checking the emphasis processing image ESIn, and thus can easily grasp the flow of the contrast agent.

Next, an example of operations of the medical image processing apparatus, the X-ray diagnostic apparatus, and the medical image processing system according to the present embodiment will be described.

Figure 7:
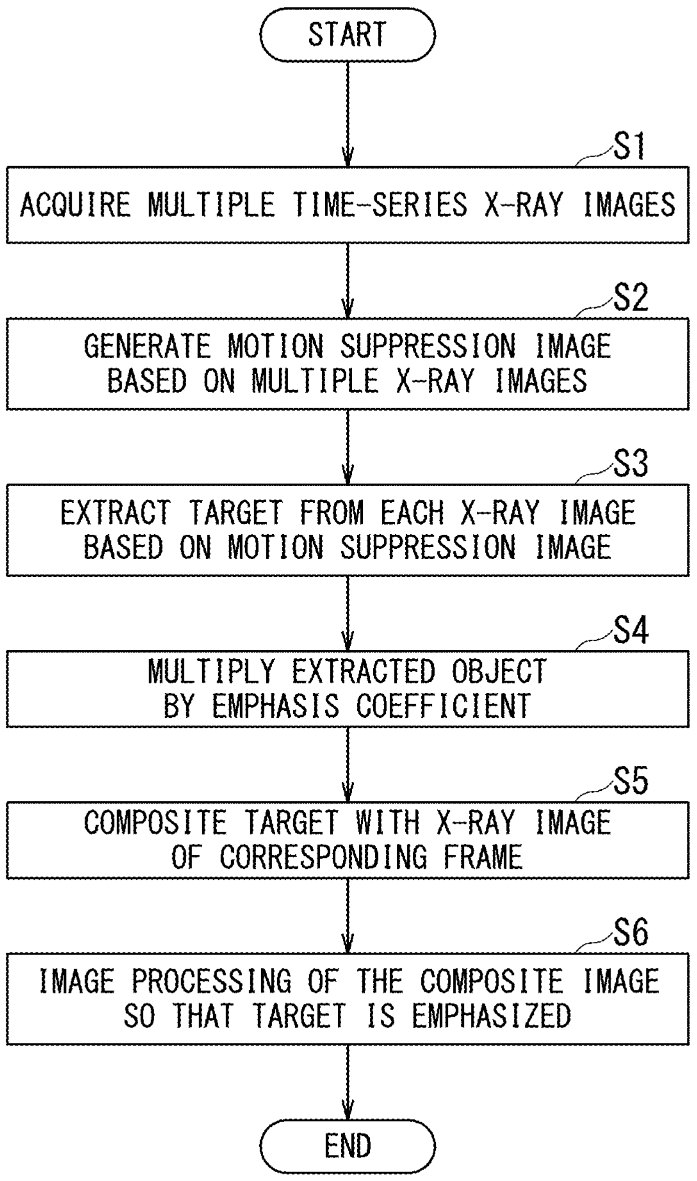
FIG. 7 a flowchart showing an example of a procedure for appropriately performing emphasis processing of the target to be observed of the X-ray image.

FIG. 7 a flowchart showing an example of a procedure for appropriately performing emphasis processing of the target to be observed of the X-ray image. FIG. 7 shows an example of processing in the post process.

First, in step S1, the acquisition function 21 obtains a plurality of time-series X-ray images I1, I2, . . . , IN of the object, which are obtained based on the X-ray imaging of the object by the X-ray diagnostic apparatus 101.

Next, in step S2, the motion suppression image generation function 22 generates the motion suppression image A in which motion related components are suppressed based on two or more of the plurality of time-series X-ray images I1, I2, . . . , IN, Next, in step S3, the extraction function 23 extracts the user's target from the X-ray image In and generates the target image Mn.

Next, in step S4, the emphasis processing image generation function 24 generates the intermediate emphasis image EMn emphasizing the target by multiplying each pixel of the target image Mn by the predetermined emphasis coefficient Ecoef. having a value of 0 or more.

Next, in step S5, the emphasis processing image generation function 24 generates the emphasis processing image SIn by compositing the intermediate emphasis image EMn and the corresponding original X-ray image In.

Next, in step S6, the emphasis processing image generation function 24 generates the emphasis processing image ESIn in which the contrast of the target to be observed is further improved from the emphasis processing image Sin by narrowing the window width WW of the emphasis processing image Sin from WWpost shown in equation (5).

With the above procedure, it is possible to appropriately perform the emphasis processing of the target to be observed in the X-ray image.

According to the medical image processing system 1 including the medical image processing apparatus 10 according to the present embodiment, the target is extracted from the X-ray image In, and the intermediate emphasis image EMn in which the extracted target is emphasized is composited with the X-ray image In, whereby it is possible to generate the emphasis processing image SIn in which the target depicted on the X-ray image In is emphasized.

Target is emphasized and non-target is suppressed in emphasis processing image SIn and emphasis processing image ESIn that is further gradation converted (see FIG. 4). Therefore, the user can observe the target accurately and in a short time even when the contrast agent or the catheter 31 that is inserted into the heart and is constantly moving due to the pulsation is the target. For example, since the contrast agent can be emphasized in the emphasis processing image, even a small amount of the contrast agent can be clearly observed in the emphasis processing image. Therefore, the amount of the contrast agent administered into the object can be reduced. Further, in the case of real-time processing, it becomes possible to shorten the X-ray imaging time, and it is possible to reduce the exposure dose of the object.

Further, the emphasis processing image generation function 24 may combine the processing using the spatial frequency with the emphasis processing of the target of the X-ray image. Examples of processing using spatial frequencies include multi-objective frequency processing and wavelet transform.

Figure 8:
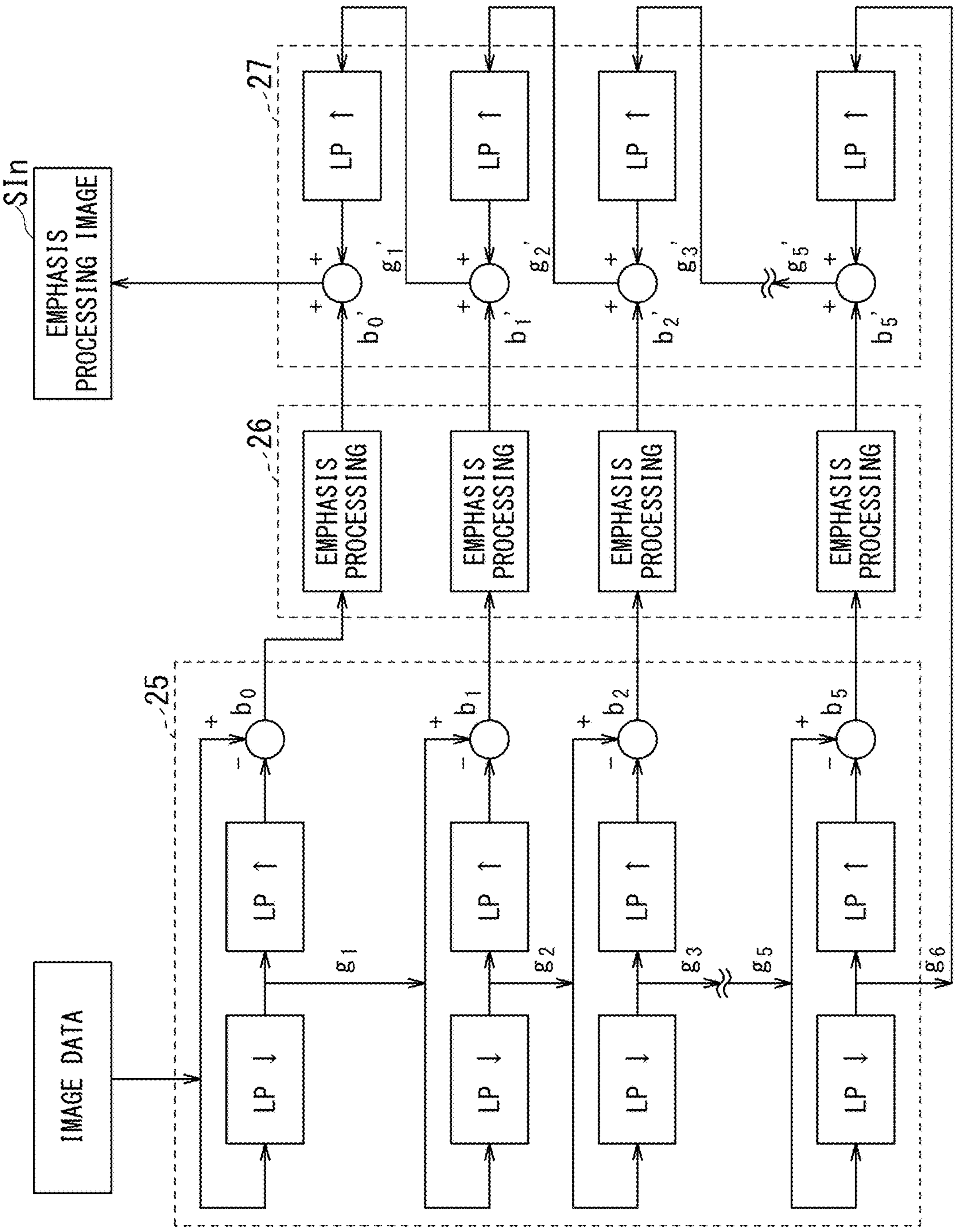
FIG. 8 is an explanatory diagram showing an example of a data flow in the case of combining emphasis processing of the target of the X-ray image and multi-frequency processing.

FIG. 8 is an explanatory diagram showing an example of a data flow in the case of combining emphasis processing of the target of the X-ray image and multi-frequency processing.

When the target emphasis processing of the X-ray image and the multi-frequency processing are combined, the processor of the processing circuitry 15 further includes the frequency band data generation function 25, the emphasis processing function 26, and the frequency band data synthesis function 27. These configurations 25-27 may be realized by software, hardware alone or a mixture of hardware and software. The frequency band data synthesis function 27 may be included in the emphasis processing image generation function 24.

The frequency band data generation function 25 converts the X-ray image In into a plurality of frequency band data. Specifically, the frequency band data generation function 25 generates background data (for example, one background data) and the plurality of frequency band data each including a predetermined frequency band from the X-ray image In. For example, the frequency band data generation function 25 generates the plurality of frequency band data each including different frequency band by performing LPF (Low Pass Filter) processing stepwise and taking a difference from the LPF processed image of one step before.

For example, the frequency band data generation function 25 first extracts low frequency data by performing LPF processing on the X-ray image In at the first stage LP↓. Here, the frequency band data generation function 25 may execute the downsampling process at LP↓ in order to speed up the subsequent processes. In this case, the frequency band data generation function 25 thins out pixels every other pixel in the horizontal direction from the low frequency data and then thins out pixels every other pixel in the vertical direction from the low frequency data to generate the low resolution image data g1 with the image size reduced to ¼.

Then, the frequency band data generation function 25 sends the low resolution image data g1 to the second stage, ↑ and executes the upsampling process and the LPF process at LP T, thereby performing the LPF process with the same size as the X-ray image In to generate low frequency data. For example, the frequency band data generation function 25 first complements the low resolution image data g1 with "0" every other pixel in the horizontal direction and then complements "0" with every other pixel in the vertical direction, and the LPF processing in which each element of the LPF is multiplied by 4 is executed. Then, the frequency band data generation function 25 generates the frequency band data b0 by subtracting the X-ray image In and the low frequency data for each pixel by the adder. A Gaussian filter of about 5×5 can be used for the LPF treatment by the frequency band data generation function 25.

The frequency band data generation function 25 executes the processing of the second and subsequent stages in the same manner as the processing of the first stage described above. The image data to be processed in each stage is the low resolution image data generated in the preceding stage. That is, the image data to be processed in the second stage is the low-resolution image data g1, and the low-resolution image data g2 to g5 generated in each stage is the image data to be processed in the respective subsequent stages. Then, the frequency band data generation function 25 uses the low resolution image data g2 to g5 in each stage to generate the frequency band data b1 to b5 as in the first stage. As such, the frequency band data generation function 25 generates the stepwise frequency band data of the X-ray image In and the background data g6 in which the contained information is only the background.

Further, the frequency band data generation function 25 generates stepwise frequency band data of the motion suppression image A by performing the same processing as the X-ray image In on the motion suppression image A. The background data g6 may not be generated for either the X-ray image In or the motion suppression image A.

Although FIG. 8 shows the case where the frequency band data generation function 25 executes the process of 6 stages, the embodiment is not limited to the case and the process can be performed in any number of stages.

The emphasis processing function 26 controls the extraction function 23 and takes the difference between the frequency band data of the X-ray image In and the frequency band data of the motion suppression image A between the corresponding frequency bands to generate difference image data for each frequency band (hereinafter referred to as band difference image data).

The ratio of incoming signals of interest (the ratio of incoming signals of moving components that are target to be observed) is considered to differ for each spatial frequency band. Therefore, the emphasis processing function 26 obtains the ratio of target included in each of the plurality of band difference image data, and based on the obtained ratio of target, assigns the emphasis coefficient Ecoef. to each of the plurality of band difference image data independently of each other.

Further, the emphasis processing function 26 controls the emphasis processing image generation function 24, and generates the intermediate emphasis image data (hereinafter, referred to as band intermediate emphasis image data) for each of the frequency bands by using the emphasis coefficient Ecoef. assigned to each of the plurality of band difference image data. In addition, the emphasis processing function 26 adds the band intermediate emphasis image data and the frequency band data of the X-ray image In between the corresponding frequency bands to generate the emphasis processing image data for each frequency band (hereinafter, the band emphasis processing image data). Further, image processing such as background compression, signal enhancement, and gradation conversion may be performed on each of the band emphasis processing image data.

The frequency band data synthesis function 27 synthesizes a plurality of the band emphasis processing image data to generate an emphasis processing image SIn. Specifically, the frequency band data synthesizing function 27 sequentially synthesizes the background data g6 and the band emphasis processing image data b0' to b5' to generate the emphasis processing image SIn having the same size as the X-ray image In. For example, the frequency band data synthesizing function 27 performs the upsampling process on the background data g6 at the first stage (lowermost stage in the figure) LP↓ (by complementing "0" for every other pixel in horizontal direction and then complementing "0" for every other pixel in the vertical direction) and performing the same LPF processing as the upsampling processing of the frequency band data generation function 25, whereby the background data g6 has the same size as the band emphasis processing image data b5'. Then, the frequency band data synthesizing function 27 generates the added data g5' by adding the same size of the band emphasis processing image data b5' and the background data g6 for each pixel by the adder.

The frequency band data synthesizing function 27 executes the above-described upsampling process and LPF process on the generated added data g5' to make the added data g5' the same size as the band emphasis processing image data b4'. The frequency band data synthesizing function 27 then adds the added data g5' with the processing image data b4' to generate added data g4'. The frequency band data synthesis function 27 similarly generates the emphasis processing image SIn in which the target is emphasized in the same size as the X-ray image In by increasing the size of the added data and performing addition with the band emphasis processing image data sequentially. The frequency band data synthesis function 27 may be one function included in the emphasis processing image generation function 24.

In this way, by combining the emphasis processing and the multi-frequency processing shown in FIG. 7, it is possible to apply an appropriate emphasis coefficient Ecoef. for each frequency band data. Enhancement coefficient Ecoef. has different appropriate value in each frequency band. Therefore, by combining the emphasis processing and the multi-frequency processing, it is possible to more selectively emphasize the signal of interest in the emphasis processing image SIn and the emphasis processing image ESIn obtained by further gradation conversion of the emphasis processing image SIn. Therefore, the target is further emphasized while the non-target components can be suppressed, as compared with the case where only the emphasis processing is applied.

Second Embodiment

Figure 9:
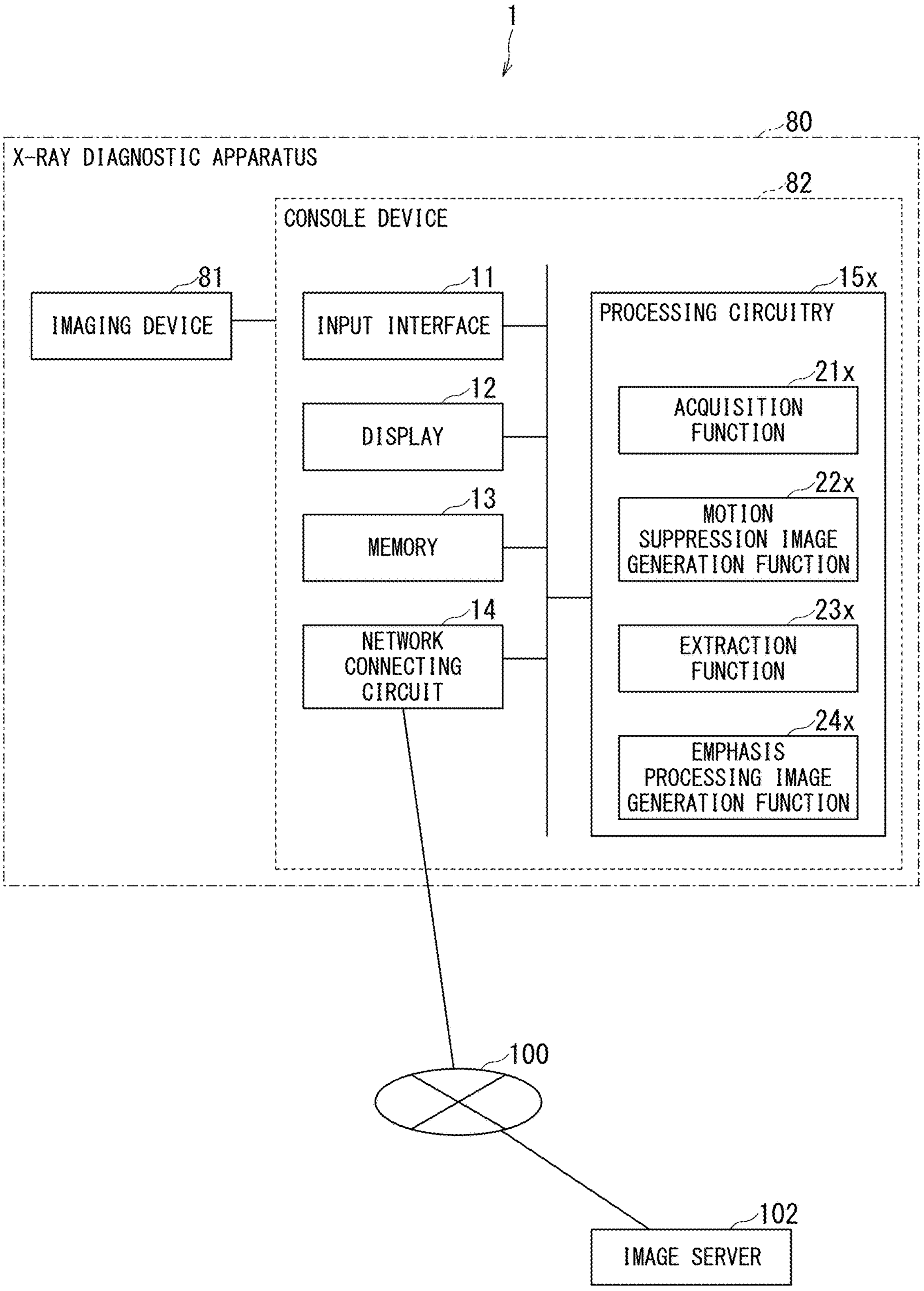
FIG. 9 is a block diagram showing a configuration example of a medical image processing system including a medical image processing apparatus according to the second embodiment.

FIG. 9 is a block diagram showing a configuration example of the medical image processing system 1 including the medical image processing apparatus 10 according to the second embodiment.

The X-ray diagnostic apparatus 80 includes the imaging device 81 that performs imaging of time-sequential N-frame X-ray images I1, I2, . . . , IN concerning the object, and the console device 82 as an example of the medical image processing apparatus 10. The X-ray diagnostic apparatus 80 shown in the second embodiment differs from the medical image processing apparatus 10 shown in the first embodiment in that a plurality of time-series X-ray images I1, I2, . . . , IN generated by itself by X-ray imaging of the object an be used. Since other configurations and operations are substantially the same as those of the medical image processing apparatus 10 shown in FIG. 1, the same configurations are denoted by the same reference numerals and description thereof will be omitted.

The imaging device 81 is composed of, for example, an imaging system of an X-ray angiography apparatus, has an imaging system such as an X-ray tube and an X-ray detector for capturing an X-ray image of the object placed on a top plate. The imaging device 81 provides the console device 82 with the plurality of time-series projection data regarding the object obtained by imaging the object.

The acquisition function 21*x* of the processing circuitry 15*x* acquires the plurality of time-series X-ray images I1, I2, . . . , IN regarding the object from the reconstruction function 20. The motion suppression image generation function 22*x* generates the motion suppression image A in which the motion related component is suppressed based on two or more of the plurality of time-series X-ray images I1, I2, . . . , IN. The extraction function 23*x* extracts the user's target from the X-ray image In and generates the target image Mn. The emphasis processing image generation function 24*x* generates the emphasis processing image SIn or ESIn in which the target is emphasized in the X-ray image In based on the target image Mn, and displays it on the display of the console device 82.

As in the medical image processing system 1 according to the first embodiment, the medical image processing system 1 including the X-ray diagnostic apparatus 80 according to the second embodiment also extracts the target from the X-ray image In, composites the intermediate emphasis image EMn in which the extracted target is emphasized with the X-ray image In, thereby generating the emphasis processing image SIn in which the target depicted on the X-ray image In is emphasized.

According to at least one of the above-described embodiments, an emphasis processing of a target to be observed in an X-ray image can be appropriately performed.

The processing circuitry in the above-described embodiments is an example of the processing circuitry described in the claims. In addition, the term "processor" used in the explanation in the above-described embodiments, for instance, refer to circuitry such as dedicated or general purpose CPUs (Central Processing Units), dedicated or general-purpose GPUs (Graphics Processing Units), or ASICs (Application Specific Integrated Circuits), programmable logic devices including SPLDs (Simple Programmable Logic Devices), CPLDs (Complex Programmable Logic Devices), and FPGAs (Field Programmable Gate Arrays), and the like. The processor implements various types of functions by reading out and executing programs stored in the memory circuitry.

In addition, instead of storing programs in the memory circuitry, the programs may be directly incorporated into the circuitry of the processor. In this case, the processor implements each function by reading out and executing each program incorporated in its own circuitry. Moreover, although in the above-described embodiments an example is shown in which the processing circuitry configured of a single processor implements every function, the processing circuitry may be configured by combining plural processors independent of each other so that each processor implements each function of the processing circuitry by executing corresponding program. When a plurality of processors are provided for the processing circuitry, the memory medium for storing programs may be individually provided for each processor, or one memory circuitry may collectively store programs corresponding to all the functions of the processors.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

(aspect 1) For instance, according to an embodiment, a medical image processing apparatus includes an acquisition unit, an extraction unit, and an emphasis processing image generation unit. The acquisition unit is configured to acquire a plurality of time-series X-ray images of an object. The extraction unit is configured to extract a motion related component in each of the plurality of X-ray images. The emphasis processing image generation unit is configured to generate an emphasis processing image in which a moving target is emphasized in each of the plurality of X-ray images based on the extracted motion related component.

(aspect 2) The emphasis processing image generation unit may generate an emphasis processing image from an X-ray image by compositing the X-ray image and the extracted motion related component.

(aspect 3) The medical image processing apparatus may further include a motion suppression image generation unit configured to generate, based on two or more of the plurality of time-series X-ray images, a motion suppression image in which motion related components are suppressed more than components that are stationary in at two or more of the plurality of time-series X-ray images. In this case, the extraction unit may extract the motion related component in each of the plurality of X-ray images by subtracting the motion suppression image from the each of the plurality of X-ray images.

(aspect 4) The motion suppression image generation unit may generate, as the motion suppression image, a mean value image or a median value image of two or more of the plurality of X-ray images.

(aspect 5) When an X-ray irradiation is switched from ON to OFF and then returned to ON, the motion suppression image generation unit may update the motion suppression image based on the motion suppression image generated before switched to OFF and the X-ray image obtained after returned to ON.

(aspect 6) When an irradiation field in X-ray imaging of the object is changed, the motion suppression image generation unit may generate the motion suppression image of the changed irradiation field such that the motion suppression image based on two or more of the plurality of time-series X-ray images imaged in the irradiation field before the change is used for the part of the changed irradiation field that overlaps with the irradiation field before the change.

(aspect 7) The emphasis processing image generation unit may multiply the extracted motion related component by a factor to generate an intermediate emphasis image, and composite the intermediate emphasis image and the X-ray image to generate the emphasis processing image.

(aspect 8) Further, the medical image processing apparatus may further include an emphasis processing unit. The emphasis processing unit converts the X-ray image into a plurality of frequency band data, assigns the emphasis coefficient to each of the plurality of frequency band data in accordance with a ratio of the extracted motion related component by cooperating with the extraction unit and the emphasis processing image generation unit, and generates image data of the intermediate emphasis image for the each of the plurality of frequency bands based on the assigned emphasis coefficient. In this case, the emphasis processing image generation unit may generate the emphasis processing image based on the image data of the intermediate emphasis image for the each of the plurality of frequency bands.

(aspect 9) The emphasis processing image generation unit may narrow a window width of the emphasis processing image such that the target is emphasized.

(aspect 10) The motion related components include movement derived from at least one of pulsation and respiration of the object and/or, when the target moves in the object, movement derived from movement of the target.

(aspect 11) A medical image processing apparatus according to an embodiment includes an acquisition unit, a motion suppression image generation unit, a subtraction image generation unit, and an emphasis processing image generation unit. The acquisition unit is configured to acquire a plurality of time-series X-ray images of an object. The motion suppression image generation unit is configured to generate, based on two or more of the plurality of time-series X-ray images, a motion suppression image in which motion related components are suppressed more than components that are stationary in the two or more of the plurality of time-series X-ray images. The difference image generation unit is configured to generate a difference image by difference processing between the motion suppression image and at least one of the time-series X-ray images. The emphasis processing image generation unit is configured to generate an emphasis processing image of the target depicted in the difference image by adding the generated difference image and the X-ray image corresponding to the difference image.

(aspect 12) A medical image processing apparatus according to an embodiment includes an acquisition unit, a representative value image generation unit, a subtraction image generation unit, and an emphasis processing image generation unit. The acquisition unit is configured to acquire a plurality of time-series X-ray images of an object. The representative value image generation unit is configured to generate a representative value image in which each pixel has a representative value of pixel values in two or more X-ray images, based on the two or more X-ray images of the plurality of time-series X-ray images. The difference image generation unit is configured to generate a difference image by difference processing between the representative value image and at least one of the time-series X-ray images. The emphasis processing image generation unit is configured to generate an emphasis processing image of the target depicted in the difference image by adding the generated difference image and the X-ray image corresponding to the difference image.

(aspect 13) The emphasis processing image generation unit may generate the emphasis processing image by adding the difference image multiplied by a factor and the X-ray image corresponding to the difference image.

(aspect 14) The emphasis processing image generation unit may narrow a window width of the emphasis processing image such that the target is emphasized.

(aspect 15) An X-ray diagnostic apparatus according to an embodiment includes an acquisition unit, an extraction unit, and an emphasis processing image generation unit. The acquisition unit is configured to acquire a plurality of time-series X-ray images of an object. The extraction unit is configured to extract a motion related component in each of the plurality of X-ray images. The emphasis processing image generation unit is configured to generate an emphasis processing image in which a moving target is emphasized in each of the plurality of X-ray images based on the extracted motion related component.

(aspect 16) A medical image processing method according to an embodiment includes the steps of acquiring a plurality of time-series X-ray images of an object, extracting a motion related component in each of the plurality of X-ray images, and generating an emphasis processing image in which a moving target is emphasized in each of the plurality of X-ray images based on the extracted motion related component.

(aspect 17) This method can be applied to a medical image processing system including a client and a server. In this case, each step of the medical image processing method may be executed by either the client or the server.

(aspect 18) A medical image processing apparatus according to an embodiment includes an acquisition unit, a representative value image generation unit, a subtraction image generation unit and an emphasis processing image generation unit. The acquisition unit is configured to acquire a plurality of time-series X-ray images of an object. The representative value image generation unit is configured to generate a representative value image in which each pixel has a representative value of pixel values at a corresponding pixel of the plurality of X-ray images. The subtraction image generation unit is configured to generate a plurality of time-series subtraction images by subtracting the representative value image from each of the plurality of X-ray images. The emphasis processing image generation unit is configured to generate a plurality of time-series emphasis processing images in which a target depicted in each of the plurality of subtraction images is emphasized, by adding to each of the plurality of X-ray images a corresponding image among the plurality of subtraction images.

(aspect 19) A medical image processing apparatus according to an embodiment includes a representative value image generation unit, an acquisition unit, a subtraction image generation unit and an emphasis processing image generation unit. The representative value image generation unit is configured to generate a representative value image in which each pixel has a representative value of pixel values at a corresponding pixel of a plurality of already acquired time-series X-ray images. The acquisition unit is configured to sequentially acquire an X-ray image of an object. The subtraction image generation unit is configured to sequentially generate a subtraction images by subtracting the representative value image from a newly acquired X-ray image. The emphasis processing image generation unit is configured to sequentially generate an emphasis processing image in which a target depicted in the corresponding subtraction image is emphasized, by adding the newly generated subtraction image to the corresponding X-ray image.

What is claimed is:

1. An X-ray diagnostic apparatus, comprising:

an X-ray tube and an X-ray detector acquiring a plurality of time-series X-ray images of an object; and processing circuitry configured to:

acquire the plurality of time-series X-ray images of the object within which a moving target is provided, the plurality of time-series X-ray images being acquired by injecting a contrast agent as the moving target into a blood vessel in a catheter treatment;

generate, based on two or more of the plurality of time-series X-ray images, a motion suppression image in which motion related components regarding the moving target are suppressed more than other components in the two or more of the plurality of time-series X-ray images, wherein, in the motion suppression image, each pixel has a representative value of pixel values of the two or more of the plurality of time-series X-ray images so that the moving target is suppressed;

generate a difference image by difference processing between the motion suppression image and one of the time-series X-ray images;

generate an emphasis processing image in which the contrast agent as the moving target is emphasized in the one of the time-series X-ray images based on the generated difference image; and display the generated emphasis processing images as a moving image, wherein frames of the moving image are composed of the emphasis process images, wherein the processing circuitry is further configured to convert each of the time-series X-ray images into a plurality of frequency band data, assign an emphasis coefficient to each of the plurality of frequency band data in accordance with a ratio of each of the motion related components, generate image data of an intermediate emphasis image for each of the plurality of frequency bands based on the assigned emphasis coefficient, and generate the emphasis processing image based on the image data of the intermediate emphasis image for each of the plurality of frequency bands.

2. The apparatus according to claim 1, wherein the processing circuitry is further configured to generate each emphasis processing image from an X-ray image by compositing the X-ray image and the difference image.

3. The apparatus according to claim 1, wherein the processing circuitry is further configured to:

extract the motion related component in each of the plurality of time-series X-ray images by subtracting the motion suppression image from each of the plurality of time-series X-ray images.

4. The apparatus according to claim 3, the processing circuitry is further configured to generate, as the motion suppression image, a mean value image or a median value image of two or more of the plurality of time-series X-ray images.

5. The apparatus according to claim 3, wherein when an X-ray irradiation is switched from ON to OFF and then returned to ON, the processing circuitry is further configured to update the motion suppression image based on the motion suppression image generated before the X-ray irradiation is switched to OFF and the X-ray image obtained after the X-ray irradiation is returned to ON.

6. The apparatus according to claim 3, wherein when an irradiation field in X-ray imaging of the object is changed, the processing circuitry is further configured to generate the motion suppression image of the changed irradiation field such that the motion suppression image based on two or more of the plurality of time-series X-ray images imaged in the irradiation field before the change is used for a part of the changed irradiation field that overlaps with the irradiation field before the change.

7. The apparatus according to claim 2, wherein the processing circuitry is further configured to multiply the extracted motion related component by a factor to generate an intermediate emphasis image, and composite the intermediate emphasis image and the X-ray image to generate the emphasis processing image.

8. The apparatus according to claim 1, wherein the processing circuitry is further configured to narrow a window width of at least one of the emphasis processing images such that the target is emphasized.

9. The apparatus according to claim 1, wherein the motion related components include a movement derived from at least one of pulsation and respiration of the object.

10. The apparatus according to claim 1, wherein the processing circuitry is further configured to generate each emphasis processing image by adding the difference image multiplied by a factor and the X-ray image corresponding to the difference image.

11. The apparatus according to claim 1, wherein the acquired plurality of time-series X-ray images includes a component related to a movement of the contrast agent that has been injected into a heart of the object and moves with a heartbeat, the acquired plurality of time-series X-ray images being acquired by imaging the heart.

12. The apparatus according to claim 1, wherein the processing circuitry is further configured to:

apply gradation conversion processing to the emphasis processing images, and display gradation converted emphasis processing images as the moving image.

13. The apparatus according to claim 1, wherein the plurality of time-series X-ray images are X-ray fluoroscopic images.

14. A medical image processing apparatus, comprising:

processing circuitry configured to:

acquire a plurality of time-series X-ray images of an object within which a moving target is provided, the plurality of time-series X-ray images being acquired by injecting a contrast agent as the moving target into a blood vessel in a catheter treatment;

generate, based on two or more of the plurality of time-series X-ray images, a motion suppression image in which motion related components regarding the moving target are suppressed more than other components in the two or more of the plurality of time-series X-ray images, wherein, in the motion suppression image, each pixel has a representative value of pixel values of the two or more of the plurality of time-series X-ray images so that the moving target is suppressed;

generate a difference image by difference processing between the motion suppression image and one of the time-series X-ray images;

generate an emphasis processing image in which the contrast agent as the moving target is emphasized in the one of the time-series X-ray images based on the generated difference image; and display the generated emphasis processing images as a moving image, wherein frames of the moving image are composed of the emphasis process images, wherein the processing circuitry is further configured to convert each of the time-series X-ray images into a plurality of frequency band data, assign an emphasis coefficient to each of the plurality of frequency band data in accordance with a ratio of each of the motion related components, generate image data of an intermediate emphasis image for each of the plurality of frequency bands based on the assigned emphasis coefficient, and generate the emphasis processing image based on the image data of the intermediate emphasis image for each of the plurality of frequency bands.

15. A medical image processing method, comprising:

acquiring a plurality of time-series X-ray images of an object within which a moving target is provided, the plurality of time-series X-ray images being acquired by injecting a contrast agent as the moving target into a blood vessel in a catheter treatment;

generating, based on two or more of the plurality of time-series X-ray images, a motion suppression image in which motion related components regarding the moving target are suppressed more than other components in the two or more of the plurality of time-series X-ray images, wherein, in the motion suppression image, each pixel has a representative value of pixel values of the two or more of the plurality of time-series X-ray images so that the moving target is suppressed;

generating a difference image by difference processing between the motion suppression image and one of the time-series X-ray images;

generating an emphasis processing image in which the contrast agent as the moving target is emphasized in the one of the time-series X-ray images based on the generated difference image; and displaying the generated emphasis processing images as a moving image, wherein frames of the moving image are composed of the emphasis processing images, wherein each of the time-series X-ray images is converted into a plurality of frequency band data, an emphasis coefficient is assigned to each of the plurality of frequency band data in accordance with a ratio of each of the motion related components, image data of an intermediate emphasis image is generated for each of the plurality of frequency bands based on the assigned emphasis coefficient, and the emphasis processing image is generated based on the image data of the intermediate emphasis image for each of the plurality of frequency bands.

16. The medical image processing method according to claim 15, wherein:

the acquiring of the X-ray images is executed by any one of a client and a server, both of which the medical image processing system includes;

extracting the motion related component is executed by any one of the client and the server; and the generating of the emphasis processing image is executed by any one of the client and the server.

* * * * *